United States Patent Office 3,555,033
Patented Jan. 12, 1971

3,555,033
5-(PIPERIDINE-4-SPIRO) OXAZOLIDIN-2-ONES
Jacques Georges Albert Maillard, Paris, France, assignor to Laboratoires Jacques Logeais, Issy-les-Moulineaux, France, a French body corporate
Filed Aug. 21, 1967, Ser. No. 661,896
Claims priority, application Great Britain, Aug. 22, 1966, 37,477/66
Int. Cl. C07d 29/26
U.S. Cl. 260—294.3   6 Claims

ABSTRACT OF THE DISCLOSURE

5 - piperidine - 4 - spiro)-oxazolidin - 2-ones of the formula:

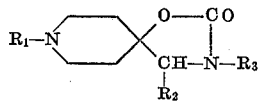

in which: $R_1$ is a member selected from the group consisting of hydrogen, lower-alkyl, phenyllower-alkyl and benzoyllower-alkyl,
$R_2$ is a member selected from the group consisting of lower-alkyl, phenyl and phenyllower-alkyl and
$R_3$ is a member selected from the group consisting of hydrogen, lower-alkyl, lower-alkenyl, lower-alkynyl; lower-alkanoyl, phenyllower-alkyl and benzoyl,
and the salts thereof, have antifibrillating and antiarythmic properties.

---

Figure 1:
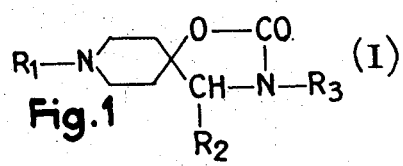

The present invention is concerned with novel compounds: 5 - piperidine - 4 - spiro) - oxazolidin - 2-ones of general Formula I illustrated in FIG. 1 of the accompanying drawing, in which:

$R_1$ is hydrogen, a lower-alkyl, plenyllower-alkyl or benzoyllower-alkyl group,
$R_2$ is a lower-alkyl, phenyl or phenyllower-alkyl group, and
$R_3$ is hydrogen, a lower-alkyl, lower-alkynyl, lower-alkanoyl, phenylower-alkyl or benzoyl group, and the pharmaceutically acceptable acid addition salts thereof Preferably, the above-defined alkyl, alkenyl, alkynyl and alkanoyl groups are lower groups containing 1–6 carbon atoms. By aryl, aralkyl, aroyl and aroylalkyl groups are also meant, conventionally,'nuclearly substituted groups of this type, particularly with halogen, alkyl, hydroxy, alkoxy, amino and alkylamino substituents. Preferably, the aryl and aroyl moieties of such groups are phenyl and benzoyl groups, respectively.

Figure 2:
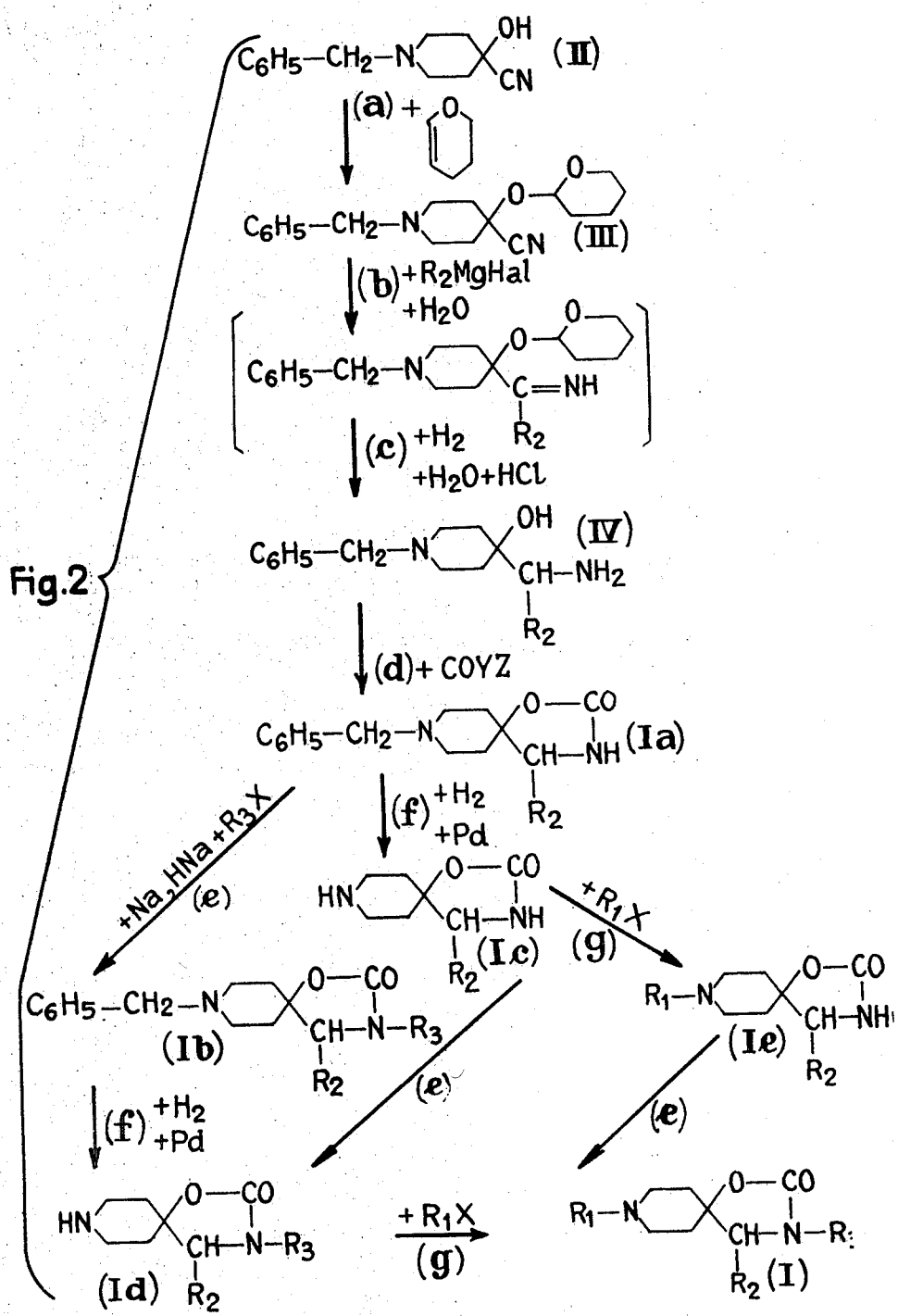

Compounds (I) exhibit useful therapeutic properties.
The invention has also for its object a process for the preparation of compounds (I), which is illustrated in FIG. 2. This process, starting from the cyanohydrin (II) of 1-benzyl-piperidin-4-one, includes steps (a) through (g), steps (e) through (g) being involved only in the preparation of some of compounds (I).

This process comprises reacting 1-benzyl-4-cyano-4-hydroxy piperidine, whose hydroxyl group is protected by addition onto the dihydropyran, with an organomagnesium halide of formula $R_2MgHal$, $R_2$ having the above defined meaning and Hal being halogen, hydrolyzing the resulting magnesium derivative and hydrogenating the hydrolysis product, thereby obtaining a 1-benzyl-4-hydroxy-4-aminomethyl piperidine substituted with group $R_2$ on the methyl group, reacting this amine with a carbonyl derivative consisting of a carbonic diester, urea, urethane or phosgene, thereby obtaining a compound (Ia) of formula:

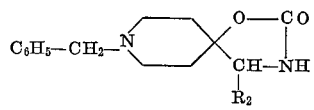

and introducing in any desired order, in said compound (Ia), substituent $R_3$, when the latter is other than hydrogen, by reaction with a compound $R_3X$ after replacement of the hydrogen to be substituted with an alkali metal, and substituent $R_1$, when the latter is other than a benzyl group, by hydrogenation followed, eventually, by reaction with a compound $R_1X$, X being halogen or a tosyl group.

The various steps of the process and the preferred procedures for carrying out such steps will be examined below in further detail.

Step (a).—For subsequent reactions, the OH grouping of cyanohydrin (II) is protected by addition in acidic medium onto the dihydropyran, leading to the dihydropyran ether of cyanohydrin (III).

Steps (b) and (c).—addition of an organomagnesium compound $R_2MgHal$ onto the nitrile group of derivative (III) leads to a complex which is not isolated and the hydrolysis of which, followed by hydrogenation by catalytic means or using lithium aluminum hydride in anhydrous neutral solvent) and then by hot treatment with excess aqueous HCl, gives hydroxylated amine (IV).

Step (d).—Ring closure of hydroxylated amine (IV) into derivative (Ia) is effected with a carbonyl derivative COYZ which may be a carbonic diester, urea or urethane, in the presence of an alkali metal alkoxide such as sodium alkoxide, or phosgene in the presence of a base which may consist of excess amine. This step results ultimately in the production of derivatives (Ia) forming a sub-group of the compound (I) family and wherein $R_1$ is the benzyl group and $R_3$ is hydrogen. To produce compounds (I) wherein $R_1$ and/or $R_3$ have another meaning, one or more of the following steps are used:

Step (e).—Derivative (Ia) is transformed into (Ib), $R_3$ having the above-mentioned meanings other than hydrogen, by means of a halide or a tosylate $R_3X$ reacting with a derivative of (Ia) wherein an alkali metal (generally, sodium) in a neutral solvent is substituted for hydrogen. This results in the production of derivatives (Ib), another sub-group of the compound (I) family and wherein $R_1$ is the benzyl group and $R_3$ is other than hydrogen.

Step (f).—Hydrogenolysis, in the presence of a palladium catalyst, of derivatives (Ia) and (Ib) leads to derivatives (Ic) and (Id), respectively, which are two further sub-groups of the compound (I) family and in which $R_1$ is hydrogen and $R_3$ is hydrogen or has any meaning, other than hydrogen, selected from those assigned above to $R_3$, respectively.

Step (g).—Derivatives (Ic) and (Id) may be substituted, on the piperidine nucleus nitrogen, with a $R_1X$ (halide or tosylate) derivative, according to the usual techniques for the substitution of secondary amines, $R_1$ having the above-mentioned meanings other than hydrogen. In this manner, there are obtained derivatives (Ie) and (I), respectively. Derivative (Ie) is a last sub-group of the compound (I) family wherein $R_3$ is hydrogen and wherein, in contrast, $R_1$ is not hydrogen.

Finally, it should be noted that step (e) may be applied to compounds (Ic) and (Ie) to result in compounds (Id) and (I), respectively.

The following examples are given for the purpose of illustrating the invention:

EXAMPLE 1.—5-(1-BENZYL-PIPERIDINE-4-SPIRO)-4-ETHYL-OXAZOLIDIN-2-ONE (Compound (Ia), $R_2=C_2H_5$)

Step (a).—(1) In a 100 cc. flask, there are introduced 8 g. of 1-benzyl-4-cyano-4-hydroxy-piperidine (II) hydrochloride and 16 cc. of anhydrous dimethylsulfoxide. After dissolution, there are added 64 cc. of anhydrous dihydropyran and 36 cc. of 4 N hydrochloric acid in ether. The mixture is maintained 24 hours in an oil bath at 60° C. After cooling, the resulting crystals are suction filtered, and are then washed, with extended stirring, with anhydrous ethyl acetate. The suction filtered and dried product weighs 7.5 g. (yield 70.7%) Inst. M.P.=195° C.

*Analysis.*—Calcd. (percent): Cl, 10.53; C, 64.17; H, 7.48. Found (percent): Cl, 10.63; C, 64.14; H, 7.55.

(2) Preparation of 1-benzyl-4-cyano - 4 - (tetrahydropyran-2-yl-oxy)-piperidine base (III): 50 mg. (0.15 mol) of 1-benzyl-4-cyano - 4 - (tetrahydropyran - 2 - yl-oxy)-piperidine hydrochloride are stirred with 1,000 cc. of water, 100 cc. of 2 N sodium hydroxide and 300 cc. of ether until disappearance of the solid. The decanted aqueous phase is extracted three times with ether. The ether extracts are dried over "Drierite" and are brought to dryness in vacuo. The remaining base is a colourless oil having a molecular weight (found) of 297 (theory 300.39). Quantitative yield.

Step (b).—Preparation of 1-benzyl - 4 - (tetrahydropyran-2-yl-oxy)-4-(1-imino-propyl)-piperidine.

In a four-necked 1 litre flask provided with reflux condenser, thermometer, stirrer and dropping funnel there are reacted 10.8 g. of magnesium turnings (0.45 atom) and 53.4 g. of ethyl bromide in 150 cc. of anhydrous ether. The 1-benzyl-4-cyano - 4 (tetrahydropyran-2-yl-oxy)-piperidine dissolved in 200 cc. of anhydrous ether is then added with stirring, over 10 minutes, at 0–5° C. An oily phase precipitates rapidly. Stirring is continued for a further 2 hours, at 0° C., and the mixture is left standing overnight at room temperature. The magnesium compound is hydrolyzed by addition of 300 g. of crushed ice and 120 g. of $ClNH_4$. Some solid impurities are filtered off, the ether phase is decanted, and the aqueous phase is extracted with $3\times100$ cc. of ether. The combined ether phases are dried over "Drierite."

Step (c).—Reduction of the imine function of the compound obtained under (b), for the purpose of producing compound (IV). The ether solution is introduced in a flask containing 9.9 g. lithium aluminum hydride (8 times the theoretical amount) and 50 cc. of ether. The reaction mixture is refluxed for 2 hours, and is then hydrolyzed with 15 cc. of isopropanol, followed by 15 cc. of concentrated NaCl solution. LiOH and $Al_2O_3$ are suction filtered and washed with ether. The solution is dried over $MgSO_4$ and to it is then added excess HCl in ether solution. The precipitated hydrochloride is suction filtered and is then boiled with normal HCl and subsequently evaporated to dryness. It is used without further purification for the reaction with phosgene.

Step (d).—5-(1-benzyl - piperidine - 4 - spiro)-4-ethyl-oxazolidin-2-one. The hydrochloride obtained (47 g.) (0.146 mol calculated as pure product) is introduced in a flask together with 300 cc. of toluene, 500 cc. of water and 72 g. (1.28 mol) of potassium hydroxide. After cooling to 0° C., there are introduced, over 20 minutes, 219 g. of toluene solution that is washed until neutral. The filtered solid is dissolved in $CHCl_3$. The chloroform and toluene solutions are combined and are brought to dryness under reduced pressure. The solid is taken up into ethyl acetate and is extracted with ice cold 2 N hydrochloric acid. The hydrochloric acid solution is then made alkaline and is extracted with $CHCl_3$. The chloroform solution is distilled to dryness, the residue is recrystallized from 210 cc. of $CCl_4$ and then from 1,100 cc. of a 6:4 water-methanol mixture. There are obtained 10.5 g. of this product. M.P.=170–171° C. M.W.: calculated: 274.37. Found: 273.9, 274.3.

*Analysis.*—Calcd. (percent): C, 70.03; H, 8.08. Found (percent): C, 69.24; H, 8.16.

EXAMPLE 2.—5-(1-BENZYL-PIPERIDINE-4-SPIRO)-3,4-DIETHYL-OXAZOLIDINE-2-ONE (Compound (Ib), $R_2=C_2H_5$ $R_3=C_2H_5$)

Step (e).—In a flask there are dispersed, with vigorous stirring, 0.402 g. (0.0174 at. g.) of sodium in 100 cc. of boiling toluene. There are added 4.8 g. (0.0174 mol) of 5-(1-benzyl-piperidine - 4-spiro)-4-ethyl-oxazolidin-2-one; refluxing and stirring are maintained until the sodium has disappeared (4 hours). After distilling to dryness in vacuo, there are added 75 cc. of anhydrous dimethyl formamide and 3.7 g. (a 5% excess) of ethyl p-toluene sulfonate. The mixture is refluxed with stirring for 2 hours, and is then distilled to dryness in vacuo. The residue is taken up with benzene and the insoluble sodium p-toluene sulfonate is filtered off. The benzene is distilled to dryness. The oil is dissolved in 2 N HCl, is made alkaline, and is extracted with cyclohexane. The cyclohexane solution is washed 6 times with water to remove the dimethylformamide, it is dried over $MgSO_4$ and hydrochloric acid in ether is then added to it. After suction-filtering and drying, the hydrochloride is crystallized twice from 2-propanol. Inst. M.P.=227° C. (dec.). Yield=50%, 3 g.

*Analysis.*—Calcd. (percent): Cl. 10.46. Found (percent): Cl. 10.57–10.59.

EXAMPLE 3.—5-(PIPERIDINE-4-SPIRO)-4-ETHYL-OXAZOLIDIN-2-ONE (Compound (Ic) $R_2=C_2H_5$)

In a 500 cc. flask there are introduced 200 cc. of anhydrous ethanol; palladium at 5% over charcoal (1 g.), and 3.6 g. of 5 - (1 - benzyl-piperidyl - 4 - spiro) 4-ethyl-oxazolidin-2-one. The mixture is hydrogenated at atmospheric pressure, with stirring. The theoretical amount of hydrogen is taken up in 2½ hours. The catalyst is filtered off and the solution is brought to dryness under reduced pressure. The solid residue is dissolved by boiling in 130 cc. of anhydrous ethyl acetate. After 16 hours in the refrigerator, 2 g. of crystals are obtained by suction-filtering (yield 82%). Tube M.P.=172–174° C.

*Analysis:* Calcd. (M.W.): 184.24. Found (M.W.): 186.70.

EXAMPLE 4.—5-(1-ETHYL-PIPERIDINE-4-SPIRO)-4-ETHYL-OXAZOLIDINE-2-ONE (Compound (Ie), $R_1=C_2H_5$ $R_2=C_2H_{57}$)

Step (g).—1.85 g. (0.01 mol) of 5-(piperidine-4-spiro)-4-ethyl-oxazolidin-2-one are dissolved in 20 ml. of anhydrous dimethyl formamide and are heated with 1.1 g. (0.01 mol) of ethyl bromide, in a closed flask, during 8 hours, at 50° C.

After evaporation of the solvent under reduced pressure, the residue is taken up with 30 ml isopropyl oxide and 30 ml. of 0.5 N HCl.

The decanted aqueous phase is evaporated to dryness under reduced pressure and the residue, consisting of the hydrochloride of the desired product, is recrystallized from ethanol.

*Analysis.*—Calcd. (percent): C, 53.1; H, 8.05; Cl, 14.30. Found (percent): C, 53.0; H, 7.80; Cl, 14.40.

EXAMPLE 5.—5-(1-BENZYL-PIPERIDINE-4-SPIRO)-4-PHENYL-OXAZOLIDIN-2-ONE (Compound (Ia) $R_2 = C_6H_5$)

Step (b).—Using the same conditions as described in Example 1, 3.65 g. (0.15 atom) of magnesium and 25.85 g. (0.165 mol) of bromobenzene are reacted in 70 ml. of anhydrous ether, and 0.05 mol of 1-benzyl-4-cyano-4-(tetrahydropyran-2-yl-oxy)-piperidine dissolved in 100 ml. of anhydrous ether are then added over 35 minutes, with stirring, at 0° C. Stirring is continued for a further 20 minutes at 0° C., and the mixture is then hydrolyzed by addition of 100 g. of ice and 50 ml. of saturated $NH_4Cl$ solution. The separated aqueous phase is extracted with ether, and the combined ether phases are dried over "Drierite."

Step (c).—The above ether solution is refluxed for 2 hours with 3.3 g. of $LiAlH_4$. The reaction mixture is hydrolyzed by addition of 25 ml. of isopropanol and 25 ml. of saturated NaCl solution, the precipitated alumina is filtered off and the ether phase is extracted with 2 N HCl. The hydrochloric solution is made alkaline with excess sodium hydroxide and the oily base is extracted with ether. After drying over "Drierite," this ether solution is treated with anhydrous HCl solution in ether. After suction-filtering and drying the precipitate, there are obtained 16.3 g. (88%) of crude hydrochloride that are crystallized from 110 ml. of t-butanol and subsequently purified by boiling in isopropanol (IV hydrochloride $R_2 = C_6H_5$).

Step (d).—6.65 g. (0.018 mol) of the above hydrochloride are introduced into a flask together with 40 ml. of toluene, 50 ml. of water and 8 g. (0.144 mol) of potassium hydroxide. 27 g. (0.054 mol) of phosgene in toluene solution are added with stirring, over 30 minutes, at 0° C. The resulting solid is filtered off and washed with chloroform. The aqueous phase is extracted with chloroform and the chloroform solutions are combined with the toluene phase. After evaporating to dryness under reduced pressure, there is obtained a solid material that is recrystallized from acetonitrile and then from methyl ethyl ketone (weight: 1.6 g.; M.P.=209–210° C.).

*Analysis.*—Calcd.: M.W. 322.4; C, 74.50%; H, 6.87%. Found: M.W., 322.8 (acidimetric determination); C, 74.42%; H, 6.78%.

EXAMPLE 6.—5-(1-γ-PHENYLPROPYL-PIPERIDINE-4-SPIRO)-4-ETHYL-OXAZOLIDIN-2-ONE (Compound (Ie) $R_1 = C_6H_5-CH_2-CH_2-CH_2$
$R_2 = C_6H_5$)

Step (g).—In a 50 cc. flask, there are introduced 1.85 g. (0.01 mol) of derivative (Ic) ($R_2 = C_2H_5$) described in Example 3, together with 30 ml. of anhydrous dimethyl formamide and 1.99 g. (0.01 mol) of 3-phenyl-1-bromopropane, and the reaction mixture is then heated 13 hours at 50° C. After distillation of the solvent under reduced pressure, the residue is taken up with 30 ml. of isopropyl oxide and 30 ml. of 0.5 N HCl. The decanted aqueous phase is made alkaline with excess 2 N sodium hydroxide and the base is extracted with ethyl acetate. Evaporation of the solvent leaves a solid which is recrystallized from 30 ml. of 1:1 methanol-water. There are obtained 1.6 g (53%) of needles. M.P.=137–138° C.

*Analysis.*—Calcd.: M.W. 302.4; C, 71.48%; H, 8.66%. Found: M.W., 303; C, 71.22%; H, 8.67%.

EXAMPLE 7. — 5-[1-(4-p-FLUOROPHENYL-4-OXOBUTYL)PIPERIDINE - 4 - SPIRO] - 4 - ETHYL - OXAZOLIDIN-2-ONE (Compound (Ie) $R_1=$F—  —CO—$CH_2$—$CH_2$—$CH_2$
$R_2 = C_2H_5$)

Step (g).—1.85 g. (0.01 mol) of derivative (Ic) ($R_2=C_2H_5$) in 30 ml. of anhydrous dimethylformamide are heated with 2.05 g. (0.01 mol) of 4-p-fluorophenyl-4-oxo-1-chloro-butane and 500 mg. of sodium iodide, for 6 hours, at 50° C. The residue obtained after evaporating to dryness under reduced pressure is taken up with 30 ml. of isopropyl oxide and 30 ml. of normal HCl. The aqueous phase is separated, and is made alkaline with excess sodium hydroxide, and is then extracted with ethyl acetate. After evaporation of the solvent, the residue is crystallized from a 1:1 methanol-water mixture, and then from isopropanol. There are obtained 1 g. (28.7%) of crystals. M.P.=151–155° C. (dec.).

*Analysis.*—Calcd.: M.W. 384.4; N, 8.04%. Found: M.W., 384.10 (acidimetric determination); N, 8.03%.

Operating as in Example 1, but substituting the ethyl bromide, in step (b), with methyl iodide, p-methoxyphenyl bromide, n-butyl bromide, p-chlorophenyl bromide and p-dimethylaminophenyl bromide, there are obtained, respectively, compounds (Ia) of Examples 8–12 listed in the following Table I:

TABLE I.—COMPOUNDS (Ia)

| Ex. | Compound | $R_2$ | M.P. ° C. |
|---|---|---|---|
| 8 | 5-(1-benzyl-piperidine-4-spiro)-4-methyl-oxazolidin-2-one | $CH_3$ | 159–160 |
| 9 | 5-(1-benzyl-piperidine-4-spiro)-4-p-methoxyphenyl-oxazolidin-2-one | p-$CH_3OC_6H_4$ | 164 |
| 10 | 5-(1-benzyl-piperidine-4-spiro)-4-n-butyl-oxazolidin-2-one | n-$C_4H_9$ | [1] 271 |
| 11 | 5-(1-benzyl-piperidine-4-spiro)-4-p-chlorophenyl-oxazolidin-2-one | p-Cl—$C_6H_4$ | 172–173 |
| 12 | 5-(1-benzyl-piperidine-4-spiro)-4-p-dimethylaminophenyl-oxazolidin-2-one | p-$(CH_3)_2N$—$C_6H_4$ | 205 |

[1] Hydrochloride.

When operating as in Example 2, but substituting the ethyl p-toluene sulfonate, in step (e), by methyl, n-butyl, allyl and propargyl p-toluene sulfonate or a corresponding halide, there are obtained, respectively, compounds (Ib) of Examples 13–16.

Similarly, when applying to the compound of Example 5 step (e) of Example 2 as such or substituting the ethyl p-toluene sulfonate of this step with phenethyl, phenylpropyl, acetyl and benzoyl p-toluene sulfonate or halide, there are obtained, respectively, the compounds (Ib) of Examples 17–21.

The compounds (Ib) thus prepared are listed in Table II below in which, for purposes of brevity, the 1-benzylpiperidine-4-spiro group is represented by the symbol B.P.S.

TABLE II.—COMPOUNDS (Ib)

| Ex. | Compound | $R_2$ | $R_3$ | M.P. ° C. |
|---|---|---|---|---|
| 13 | 5-(B.P.S.)-3-methyl-4-ethyl-oxazolidin-2-one | $C_2H_5$ | $CH_3$ | [1] 222 |
| 14 | 5-(B.P.S.)-3-n-butyl-4-ethyl-oxazolidin-2-one | $C_2H_5$ | n-$C_4H_9$ | |
| 15 | 5-(B.P.S.)-3-allyl-4-ethyl-oxazolidin-2-one | $C_2H_5$ | $CH_2CH=CH_2$ | [2] 236 |
| 16 | 5-(B.P.S.)-3-propargyl-4-ethyl-oxazolidin-2-one | $C_2H_5$ | $CH_2C \equiv CH$ | 105–106 |
| 17 | 5-(B.P.S.)-3-ethyl-4-phenyl-oxazolidin-2-one | $C_6H_5$ | $C_2H_5$ | 104–142 |
| 18 | 5-(B.P.S.)-3-phenethyl-4-phenyl-oxazolidin-2-one | $C_6H_5$ | $C_6H_5CH_2CH_2$ | |
| 19 | 5-(B.P.S.)-3-α-phenylpropyl-4-phenyl-oxazolidin-2-one | $C_6H_5$ | $C_6H_5(CH_2)_3$ | 120–121 |
| 20 | 5-(B.P.S.)-4-phenyl-3-acetyl-oxazolidin-2-one | $C_6H_5$ | $CH_3CO$ | [2] 200 |
| 21 | 5-(B.P.S.)-4-ethyl-3-benzoyl-oxazolidin-2-one | $C_6H_5$ | $C_6H_5CO$ | 98–100 |

[1] Decomposition (hydrochloride).
[2] Hydrochloride.

EXAMPLE 22.—5-(PIPERIDINE-4-SPIRO)-4-PHENYL-OXAZOLIDIN-2-ONE (Compound (Ic) $R_2=C_6H_5$)

Step (f).—7 g. of 5-(1-benzyl-piperidine-4-spiro)-4-phenyl-oxazolidin-2-one dissolved in 750 ml. of absolute ethanol are hydrogenated under normal pressure, at 50° C., in the presence of 0.5 g. of carbon containing 5% palladium. The theoretical amount of hydrogen (486 cc.) is taken up in 6 hours. The filtered solution is evaporated to dryness, leaving an oil which crystallizes slowly. After 2 recrystallizations from benzene, there are obtained 4.6 g. of product (92%). M.P.=160–161° C.

*Analysis.*—Calcd. (percent): C, 67.21; H, 6.94; N, 12.06. Found (percent): C, 66.96; H, 7.15; N, 12.14.

EXAMPLE 23.—5-(PIPERIDINE-4-SPIRO)-3,4-DIETHYL-OXAZOLIDIN-2-ONE (Compound (Id) $R_2=R_3=C_2H_5$)

Step (f).—17 g. (0.056 mol) of 5-(1-benzyl-piperidine-4-spiro) - 3,4-diethyl-oxazolidin-2-one hydrochloride are converted into the free base by addition of aqueous sodium hydroxide. After ether extraction and evaporation of the solvent, the base is obtained in the form of an oil which is hydrogenated under normal pressure and temperature, in 200 ml. of ethanol, in the presence of palladium-over-charcoal. Yield: 91%.

*Analysis.*—Calcd.: C, 62.22%; H, 9.50%; M.W. (acidimetric determination) 212.3. Found: C, 61.57%; H, 9.95%; M.W. (acidimetric determination) 212.2.

EXAMPLE 24.—5-(PIPERIDINE-4-SPIRO)-3-ETHYL-4-PHENYL-OXAZOLIDIN-2-ONE (Compound (Id) $R_2=C_6H_5$ $R_3=C_2H_5$)

Step (f).—8 g. of 5-(1-benzyl-piperidine-4-spiro)-3-ethyl-4-phenyl-oxazolidin-2-one are hydrogenated in 100 ml. of ethanol in the presence of palladium-over-charcoal, at 50° C., at ordinary pressure. The oily base is obtained by evaporation of the solvent. (Yield 100%).

*Analysis.*—Calcd.: M.W. (acidimetric determination) 260.3. Found: M.W. (acidimetric determination) 267.

EXAMPLE 25.—5-(1-β-PHENYLETHYL-PIPERIDINE-4-SPIRO)-4-PHENYL-OXAZOLIDIN-2-ONE (Compound (Ie) $R_1=C_6H_5CH_2CH_2$ $R_2=C_6H_5$)

Step (g).—5.5 g. (0.0236 mol) of 5-(piperidine-4-spiro)-4-phenyl-oxazolidin-2-one are heated with 30.8 g. (0.165 mol) of 1-phenyl-2-bromo-ethane, as in Example 6.

The base released by alkalinization precipitates as a solid which is recrystallized from 250 ml. of isopropanol. Weight, 3.6 g. (45.5%). M.P.=234° C. (inst.).

*Analysis.*—Calcd. (percent): C, 75.19; H, 6.91; N, 8.36. Found (percent): C, 75.03; H, 7.33; N, 8.34.

EXAMPLE 26.—5-(1-γ-PHENYLPROPYL-PIPERIDINE-4-SPIRO)-4-PHENYL-OXAZOLIDIN-2-ONE (Compound (Ie) $R_1=C_6H_5CH_2CH_2CH_2$ $R_2=C_6H_5$)

Step (g).—4.7 g. (0.02 mol) of 5-(piperidine-4-spiro)-4-phenyl-oxazolidin-2-one are heated with 16 g. (0.08 mol) of 1-phenyl-3-bromo-propane, as in the preceding example.

The base is obtained as a solid which is recrystallized from acetonitrile. Weight: 4.2 g. (59%). M.P.=163–4° C.

*Analysis.*—Calcd. (percent): C, 75.39; H, 7.48; N, 8.0. Found (percent): C, 75.37; H, 7.50; N, 8.10.

EXAMPLE 27.—5-[1-(4-p-FLUOROPHENYL-4-OXO-BUTYL)-PIPERIDINE-4-SPIRO]-4-PHENYL-OXAZOLIDIN-2-ONE (Compound (Ie) $R_1=F-\langle C_6H_4 \rangle-CO-CH_2CH_2CH_2$ $R_2=C_2H_5$)

Step (g).—8.13 g. (0.035 mol) of 5-(piperidine-4-spiro)-4-phenyl-oxazolidin-2-one are heated with 14 g. (0.070 mol) of 3-p-fluorobenzoyl-1-chloro-propane, in a boiling water-bath, until neutral (1½ hrs.). The mixture is taken up with 100 ml. of ether, the crystals are suction filtered, dissolved in boiling water and decolorized over charcoal. The base is released by alkalinization of the filtrate and is extracted with chloroform. After evaporation of the solvent, the residue is taken up with methyl ethyl ketone followed by ethyl acetate, and is converted into hydrochloride by addition of a solution of HCl in ether. After further decolorization of the hydrochloride with charcoal, the base is again obtained by alkalinization and is solidified by trituration with methalyl, and is then recrystallized from ethyl acetate. Weight: 3.3 g. (23%). M.P. 159–61° C.

*Analysis.*—Calcd.: N, 7.07%; M.W. acidimetric determination 396.4. Found; N, 7.12%; M.W. (acidimetric determination) 396.

The following compounds (Ie) were prepared in the same manner as in Examples 25–27 (step (g)):

EXAMPLE 28.—5-(1-n-HEXYL-PIPERIDINE-4-SPIRO)-4-PHENYL-OXAZOLIDINE-2-ONE (Compound (Ie) $R_1=CH_3(CH_2)_5$ $R_2=C_6H_5$)

M.P.=168–170° C.

*Analysis.*—Calcd. (percent): C, 72.11; H, 8.92; N, 8.85. Found (percent): C, 72.08; H, 8.95; N, 8.95.

EXAMPLE 29.—5-(1-PHENACYL-PIPERIDINE-4-SPIRO)-4-ETHYL-OXAZOLIDINE-2-ONE (Compound (Ie) $R_1=C_6H_5-CO-CH_2$ $R_2=C_2H_5$)

M.P. 178–180° C.

*Analysis.*—Calcd. (percent): C, 67.52; H, 7.33; N, 9.27. Found (percent): C, 67.67; H, 7.49; N, 9.14.

EXAMPLE 30.—5-[1-(3-PHENYL-3-OXO-PROPYL)-PIPERIDINE-4-SPIRO]-4-ETHYL-OXAZOLIDIN-2-ONE (Compound (Ie) $R_1=C_6H_5-CO-CH_2CH_2$ $R_2=C_2H_5$)

M.P.=146–148° C.

*Analysis.*—Calcd. (percent): C, 68.33; H, 7.65; N, 8.85. Found (percent): C, 68.35; H, 7.75; N, 8.90.

The Examples 31–33 below relate to the preparation of compounds (I).

EXAMPLE 31.—5-(1-β-PHENYLETHYL-PIPERIDINE-4-SPIRO)-3,4-DIETHYL-OXAZOLIDIN-2-ONE (Compound (I) $R_1=C_6H_5CH_2CH_2$ $R_2=R_3=C_2H_5$)

Step (g).—4.2 g. (0.02 mol) of 5-(piperidine-4-spiro)-3,4-diethyl-oxazolidin-2-one and 14 g. (0.08 mol) of 1-phenyl-2-bromo-ethane are heated during 5 hours in a boiling water-bath. The mixture sets rapidly to a mass. After cooling, the crystalline solid is diluted with ether and is suction filtered. It is dissolved in hot water and is decolorized over active charcoal. The solution is made alkaline with excess sodium hydroxide: the oily base is extracted with cyclohexane. After evaporation of the solvent, the residue is taken up with a small excess of normal HCl at 40° C.: the resulting hydrochloride dissolves, and then recrystallizes. Weight: 5.85 g. (83%). M.P. 202° C. (inst.).

*Analysis.*—Calcd. (percent): C, 64.66; H, 8.28; Cl, 10.04. Found (percent): C, 64.82; H, 8.33; Cl, 10.08.

EXAMPLE 32.—5-(1-γ-PHENYLPROPYL-PIPERIDINE-4-SPIRO)-3,4-DIETHYL-OXAZOLIDIN-2-ONE (Compound (I) $R_1=C_6H_5CH_2CH_2CH_2$ $R_2=R_3=C_2H_5$)

Step (g).—4.25 g. (0.02 mol) of 5-(piperidine-4-spiro)-3,4-diethyl-oxazolidin-2-one are heated with 16 g. (0.08 mol) of 1-phenyl-3-bromo-propane, as in the preceding example.

The extracted base is converted into hydrochloride which is recrystallized from dioxan and then from water. Weight: 3.1 g. (42%). M.P.=152° C. (inst.).

*Analysis.*—Calcd. (percent): C, 65.46; H, 8.51; N, 7.64; Cl, 9.66. Found (percent): C, 65.41; H, 8.71; N, 7.64; Cl, 9.76.

EXAMPLE 33.—5-[1-(4-p-FLUOROPHENYL-4-OXO-BUTYL)-PIPERIDINE - 4 - SPIRO]-3,4-DIETHYL-OXAZOLIDIN-2-ONE

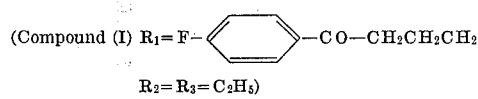

(Compound (I) $R_1 = F-$⟨ ⟩$-CO-CH_2CH_2CH_2$ $R_2 = R_3 = C_2H_5$)

Step (g).—4.25 g. (0.020 mol) of 5-(piperidine-4-spiro)-3,4-diethyl-oxazolidin-2-one are treated in the hot with 8 g. (0.040 mol) of 3-p-fluorobenzoyl-1-chloro-propane, as in the preceding example.

The hydrochloride obtained by addition of a solution of HCl in ether is crystallized from isopropanol. Weight: 2.45 g. (30%). M.P. 184° C.

*Analysis.*—Calcd. (percent): N, 6.78; Cl, 8.58. Found (percent): N, 6.78; Cl, 8.69.

As mentioned hereinbefore, the 5-(piperidine-4-spiro)-oxazolidin-2-ones of formula (I) exhibit useful therapeutic properties. They possess, particularly, anti-arhythmic and anti-fibrillating properties evidenced on the isolated heart of mammalians or on the entire animal and confirmed in human clinics.

The evaluation of the refractory period of time during which the myocardial tissue is no longer responsive to the action of an external electric stimulus was effected on isolated rabbit hearts perfused with a physiological solution at 37° C.

The introduction of the test materials in the perfusion liquid produces an extension of this resting period, representing a decrease of the potential appearance of extrasystoles. The results obtained are summarized in the following table:

| Product of Example No.: | Percent extension of the refractory period of time (on isolated heart) |
|---|---|
| 1 | 25% at a concentration of 5 γ/ml. |
| 1 | 37% at a concentration of 25 γ/ml. |
| 2 | 25% at a concentration of 5 γ/ml. |
| 2 | 65% at a concentration of 25 γ/ml. |
| 5 | 55% at a concentration of 5 γ/ml. |
| 6 | 53% at a concentration of 5 γ/ml. |
| 7 | 100% at a concentration of 10 γ/ml. |
| 8 | 47% at a concentration of 10 γ/ml. |
| 9 | 40% at a concentration of 5 γ/ml. |
| 17 | 53% at a concentration of 5 γ/ml. |
| 23 | 38% at a concentration of 50 γ/ml. |
| 27 | 40% at a concentration of 5 γ/ml. |
| 31 | 70% at a concentration of 5 γ/ml. |
| 32 | 52% at a concentration of 5 γ/ml. |
| 33 | 70% at a concentration of 10 γ/ml. |

On the other hand, heart fibrillations were produced in rat by injection of aconitine nitrate, by the I.V. route, at the dosage of 7 g. per animal.

The administration of anti-fibrillating materials, begun 1 hour prior to the aconitine injection, insures protection of the animals.

Thus:

20 mg./kg., by the intraveinous route, of the product of Example 1, protect 65% of the animals.

90 mg./kg. per os, of the product of Example 1, protect 25% of the animals.

10 mg./kg., by the intraveinous route, of the product of Example 6, protect 65% of the animals.

I claim:

1. A member selected from the group consisting of the 5-(piperidine-4-spiro)-oxazolidin-2-ones of the general formula:

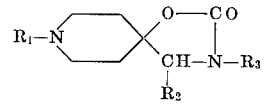

in which $R_1$ is a member selected from the group consisting of hydrogen, lower-alkyl, phenyllower-alkyl and benzoyllower-alkyl, $R_2$ is a member selected from the group consisting of lower-alkyl, phenyl and lower-alkyl phenyl, and $R_3$ is a member selected from the group consisting of hydrogen, lower-alkyl, lower-alkenyl, lower-alkynyl, lower-alkanoyl, phenyllower-alkyl and benzoyl, and the pharmaceutically acceptable acid addition salts thereof.

2. 5-(1-γ-phenylpropyl-piperidine - 4 - spiro)-4-ethyl-oxazolidin-2-one and the pharmaceutically acceptable acid addition salts thereof.

3. 5-[1-(4-p-fluorophenyl - 4 - oxo-butyl)-piperidine-4-spiro]-4-ethyl-oxazolidin-2-one and the pharmaceutically acceptable acid addition salts thereof.

4. 5[1-(4-p-fluorophenyl - 4 - oxo-butyl)-piperidine-4-spiro]-4-phenyl-oxazolidin-2-one and the pharmaceutically acceptable acid addition salts thereof.

5. 5-(1-β-phenylethyl-piperidine - 4 - spiro) - 3,4 - diethyl-oxazolidin-2-one and the pharmaceutically acceptable acid addition salts thereof.

6. 5-(1-γ-phenylpropyl-piperidine - 4 - spiro)-3,4-diethyl-oxazolidin-2-one and the pharmaceutically acceptable acid addition salts thereof.

References Cited

UNITED STATES PATENTS 3,399,192   8/1968   Regnier et al. _____ 260—240

OTHER REFERENCES

Parham et al., J. Am. Chem. Soc., 70, 4187–9 (1948).

HENRY R. JILES, Primary Examiner

G. THOMAS TODD, Assistant Examiner

U.S. Cl. X.R.

424—267; 260—294.7